April 28, 1925.

A. E. KINTNER 1,535,163

OPTICAL DEMONSTRATING DEVICE

Filed Feb. 8, 1923

INVENTOR.
Alcuin E. Kintner
BY
Pay, Oberlin & Pay
ATTORNEYS

Patented Apr. 28, 1925.

1,535,163

UNITED STATES PATENT OFFICE.

ALCUIN E. KINTNER, OF PAINESVILLE, OHIO, ASSIGNOR TO THE W. A. JONES OPTICAL COMPANY, OF CLEVELAND, OHIO, A CORPORATION OF OHIO.

OPTICAL DEMONSTRATING DEVICE.

Application filed February 8, 1923. Serial No. 617,714.

*To all whom it may concern:*

Be it known that I, ALCUIN E. KINTNER, a citizen of the United States, and a resident of Painesville, county of Lake, and State of Ohio, have invented a new and useful Improvement in Optical Demonstrating Devices, of which the following is a specification, the principle of the invention being herein explained and the best mode in which I have contemplated applying that principle, so as to distinguish it from other inventions.

The present invention relates to a mechanical device adapted to show refracted light as in the interior of the human eye and is so arranged that all of the various optical defects may be illustrated and also show how the lenses may be used to correct any or all of these optical defects. It may also be used to show how defective eyes receive the light imperfectly and thus the cause for imperfect sight and then provides means whereby the necessary correcting lenses can be employed so as to show how these lenses overcome the defects previously illustrated.

The device consists essentially of a hollow sphere made to simulate the human eye and provided with a movable disc adapted to represent the retina of the eye and with a lens opposite to the disc, the lens taking the place of the pupil so that a beam of light can be thrown on to the retina. Means are also provided in front of the lens for receiving and holding small lenses such as are commonly used in glasses and these may be inserted so as to show the correction necessary for any optical defect. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Figure 1:
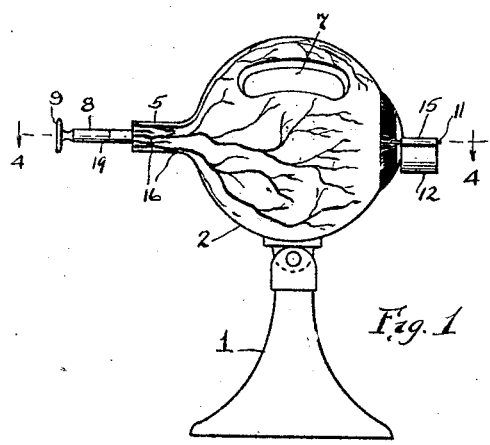
Figure 2:
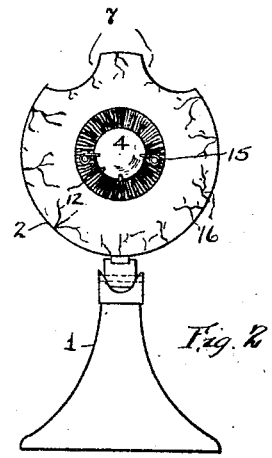
Figure 3:
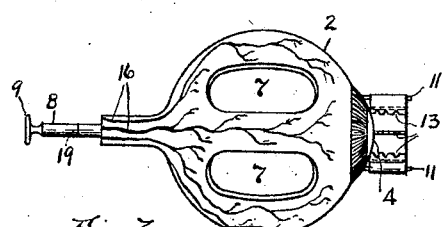
Figure 4:
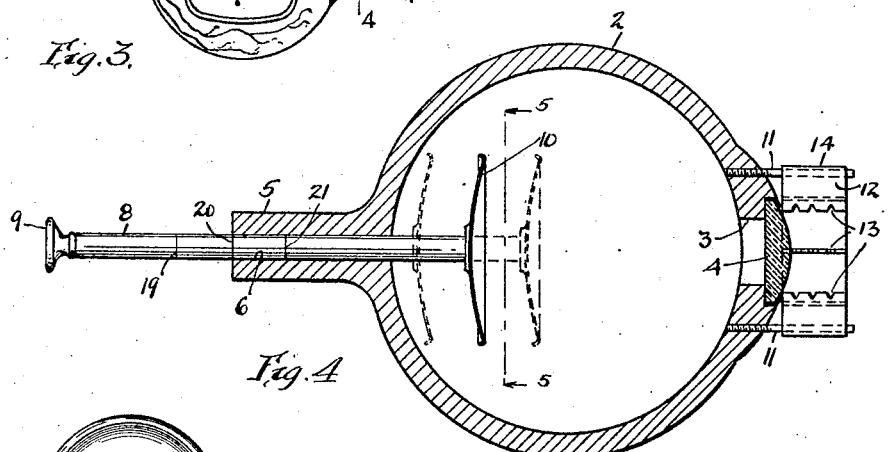
Figure 5:
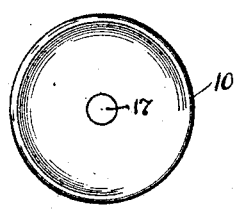

Fig. 1 is a side elevational view of the present device; Fig. 2 is a front elevational view of the same; Fig. 3 is a top plan view; Fig. 4 is a sectional view on the line 4—4 of Fig. 1; and Fig. 5 is a sectional view on the line 5—5 of Fig. 4.

The present device consists of a base member or standard 1 on which is pivotally mounted a hollow, substantially spherical member 2 which is provided at the front with an opening 3 carrying a lens 4 and which has at the rear a cylindrical projection 5 provided with an opening 6 extending into the member. At the two sides near the top are two large openings 7 so that the interior of the member is visible. Movably mounted through the cylindrical projection in the rear is a rod 8 having a handle 9 at the rear end and carrying a disc 10 on the inner end of the rod, the disc being concave. At the front of the member and at the sides of the lens are mounted two pins 11 which carry a removable lens holder 12 consisting of a piece of sheet metal having a semicylindrical portion provided at the upper edges and bottom with teeth 13 to receive and hold an eye glass lens in position and this holding member is provided with two outwardly extending flanges 14 having rolled under ends forming cylinders 15 adapted to fit over the pins to secure the holding member in position in front of the lens.

The spherical member is adapted to represent a human eye and is preferably painted or finished so as to simulate the eye ball, there being the usual veins or arteries 16 painted on the outside of the member. The inner surface of the sphere is preferably dark colored and the disc which is removably mounted within the sphere is painted a lighter color to represent the retina of the eye, the main portion of the disc representing the fundus of the eye and this disc is provided with a central spot 17 of lighter color representing the forea or the most sensitive part of the fundus. Around the lens in the front of the eye which represents the pupil of the eye is a darkened portion simultating the colored part of the eye and the entire device is preferably made as near as possible like the human eyeball.

The adjusting rod 8 for the disc is provided with three marks or indicating lines 19, 20 and 21, the central one 20 being so placed that when the rod is moved to a point where this indicating mark is in line with the rear edge of the cylindrical projection, then the disc or retina will be in its normal position relative to the lens so that a beam of light will be correctly focused on the forea or spot on the disc.

Any desired optical defect may be quickly and correctly illustrated by the present apparatus. If near-sightedness is to be shown, the disc will be moved rearwardly from its normal position, thus throwing the disc out of focus with respect to the lens mounted in the spherical member and the amount of near-sightedness will be illustrated by the distance from its normal position that the disc is moved. The correction for this condition in the human eye may then be quickly illustrated by placing in the holder in front of the lens a small eye glass lens which will correct for the amount of error that has been indicated by moving the disc or retina rearwardly.

Far-sighted defects in human vision may be illustrated by moving the disc in the opposite direction and then by inserting the necessary correcting eye glass lens in the holder so as to again focus the beam of light correctly upon the spot or forea of the disc. Where it is desired to illustrate other optical defects such as astigmatism, this may be readily done by setting the disc at its normal position for the lens and then by inserting the lens in the holder which will deflect the light beam in a manner corresponding to any desired degree of astigmatism and then the correction may be shown by inserting another lens in the holder to again focus the beam of light properly upon the forea or spot on the disc. As the holder is provided with a series of notches or teeth for a number of lenses, it is possible to show the correction for compound defects as well as for any individual defect.

The present device is particularly useful to manufacturing occulists and to physicians specializing in eye troubles, inasmuch as it allows them to clearly and quickly illustrate to their clients the types of defects which are present and the method in which these defects are corrected by the use of glasses. It is particularly valuable inasmuch as any type of optical defects may be illustrated and corrected and it also makes it possible to show the effect of compound defects and the way these are corrected by the use of the necessary eye glass lens.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In an optical demonstrating device, the combination of a hollow member adapted to represent an eyeball and having apertures at the front and in the rear thereof, respectively, a lens in such front aperture adapted to represent the pupil of the eye, a rod longitudinally movably mounted in such rear aperture, a disk on said rod and lying within said member adapted to represent the fundus of the eye, said rod and disk being movable to show optical defects, and holding means mounted on said member and adapted to receive eyeglass lenses to correct the optical defects simulated by thus moving said disk, said holding means being so positioned as to place a lens held thereby in alignment with the apertures in said member and the latter being formed to permit observation of said disk.

2. In an optical demonstrating device, the combination of a hollow member adapted to represent an eyeball and having apertures at the front and in the rear thereof, respectively, a lens in such front aperture adapted to represent the pupil of the eye, a rod longitudinally movably mounted in such rear aperture, a disk on said rod adapted to represent the fundus of the eye, said disk being concave and provided with a spot representing the forea of the eye, said rod and disk being movable to show optical defects, and holding means mounted on said member and adapted to receive eyeglass lenses to correct the optical defects simulated by thus moving said disk, said holding means being so positioned as to place a lens held thereby in alignment with the apertures in said member and the latter being formed to permit observation of said disk.

Signed by me this 5th day of February, 1923.

ALCUIN E. KINTNER.